US006687250B1

(12) United States Patent
Suzuki et al.

(10) Patent No.: US 6,687,250 B1
(45) Date of Patent: Feb. 3, 2004

(54) DEVICE WITH QUALITY CONTROLLABLE SAR FUNCTION BY UPPER LAYER INSTRUCTION, LSI UNIT AND QUALITY CONTROL METHOD BY UPPER LAYER INSTRUCTION

(75) Inventors: Yuichi Suzuki, Tokyo (JP); Tatsuhiko Amagai, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/579,508

(22) Filed: May 26, 2000

(30) Foreign Application Priority Data

May 31, 1999 (JP) .......................................... 11-152616

(51) Int. Cl.$^7$ .............................. H04L 12/28; H04J 3/24
(52) U.S. Cl. ................. 370/395.65; 370/389; 370/392; 370/474
(58) Field of Search ................................ 370/218, 230, 370/232, 235, 310.1, 352, 389, 392, 399, 395.54, 395.65, 470, 471, 474, 469, 395.6, 395.53, 353

(56) References Cited

U.S. PATENT DOCUMENTS

| | | | | |
|---|---|---|---|---|
| 5,991,308 A | * | 11/1999 | Fuhrmann et al. | 370/395.53 |
| 6,088,355 A | * | 7/2000 | Mills et al. | 370/392 |
| 6,108,336 A | * | 8/2000 | Duault et al. | 370/395.6 |
| 6,370,138 B1 | * | 4/2002 | Kim et al. | 370/353 |
| 6,373,846 B1 | * | 4/2002 | Daniel et al. | 370/395.65 |

FOREIGN PATENT DOCUMENTS

| | | |
|---|---|---|
| JP | 10-336184 | 12/1998 |
| JP | 11-187024 | 7/1999 |
| JP | 11-313079 | 11/1999 |
| JP | 2000-232482 | 8/2000 |
| JP | 2000-286849 | 10/2000 |
| JP | 2000-341275 | 12/2000 |

OTHER PUBLICATIONS

"Permoance evaluation of quasi–synchronous CMDA for satellite mobile systems", GLOBECOM '90:IEEE, 1800–1804, Apr. 1990.*
K. Noritake et al., "A Study on Selective Cell Discard Control in ATM–CL Network", The Institute of Electronics, Information and Communication Engineers, Technical Research Report SSE94–77, vol. 94, No. 95, Jun. 17, 1994 with Abstract.

(List continued on next page.)

*Primary Examiner*—Chi Pham
*Assistant Examiner*—Afsar M Qureshi
(74) *Attorney, Agent, or Firm*—Sughrue Mion, PLLC

(57) ABSTRACT

A device with quality controllable SAR function according to upper layer instruction enables reassembly and segmentation SAR of AAL5 to which priority in upper layer is reflected to be provided in reassembly and segmentation of AAL5 in ATM layer processing. This device is provided with a frame storage unit for executing reassembly of a frame of AAL5 (ATM Adaptation Layer Type 5) from an ATM (Asynchronous Transfer Mode) cell, an identification adder for receiving a cell stream through a cell reassembly processor, and for adding an identifier on a basis of cell header information in order to introduce the cell which the frame storage unit receives therein into the frame storage unit or on the basis of upper layer information within a cell payload, a cell reassembly unit for assembling the cell received by the cell reassembly processor, a next processing decision unit having a second priority part for deciding either sending or abolition of the frame concerned on the basis of the received header on the occasion of sending the frame obtained from the cell received according to the cell reassembly processor and/or on the basis of the upper layer information within the payload, a storage unit for storing therein an inputted transmission frame, and a selector for selecting the transmission frame sent from the storage unit.

32 Claims, 3 Drawing Sheets

OTHER PUBLICATIONS

S. Touma, "Traffic Characteristics of IP Packet for Shared Bandwidth ATM Cell Multiplexing with EPD", The Institute of Electronics, Information and Communication Engineers, Technical Research Report CS98–39, vol. 98, No. 147, Jun. 25, 1998 with Abstract.

K. Noritake et al., "A Study of Early Packet Discard (EPD) Scheme for ATM Connectionless Server (CLS)", Institute of Electronics, Information and Communication Engineers, General Conference B–7–211, Mar. 24–27, 1997.

* cited by examiner

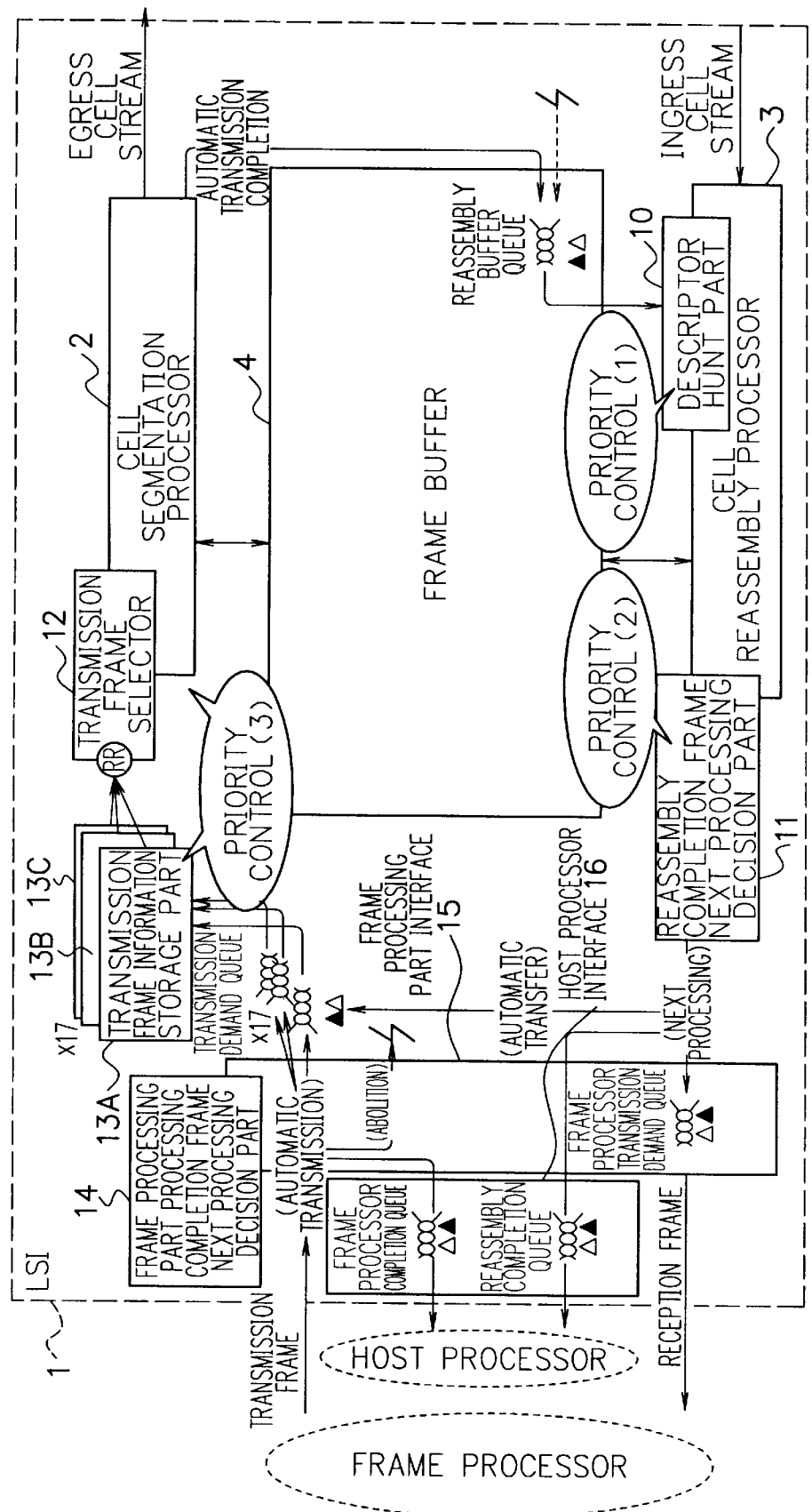

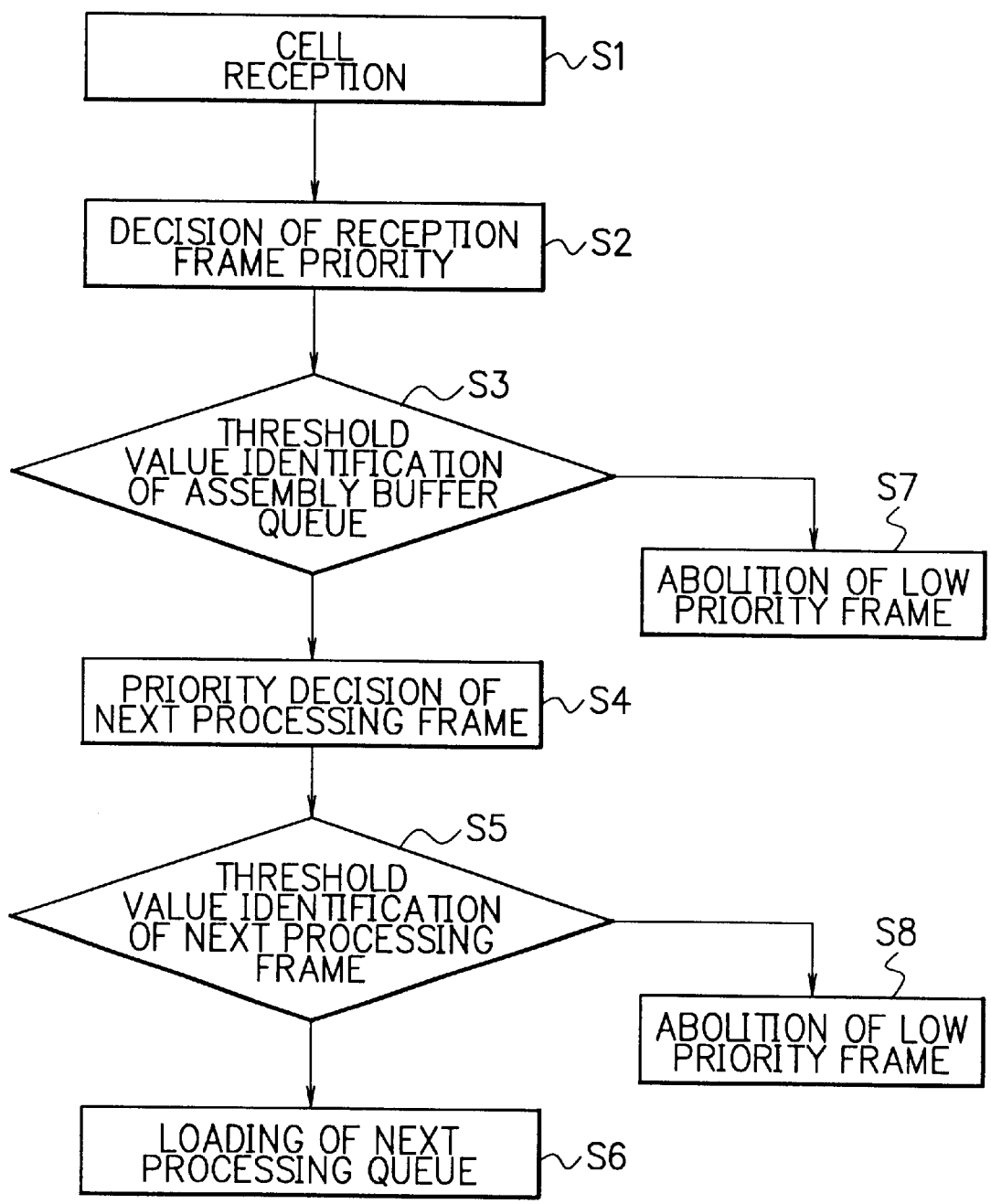

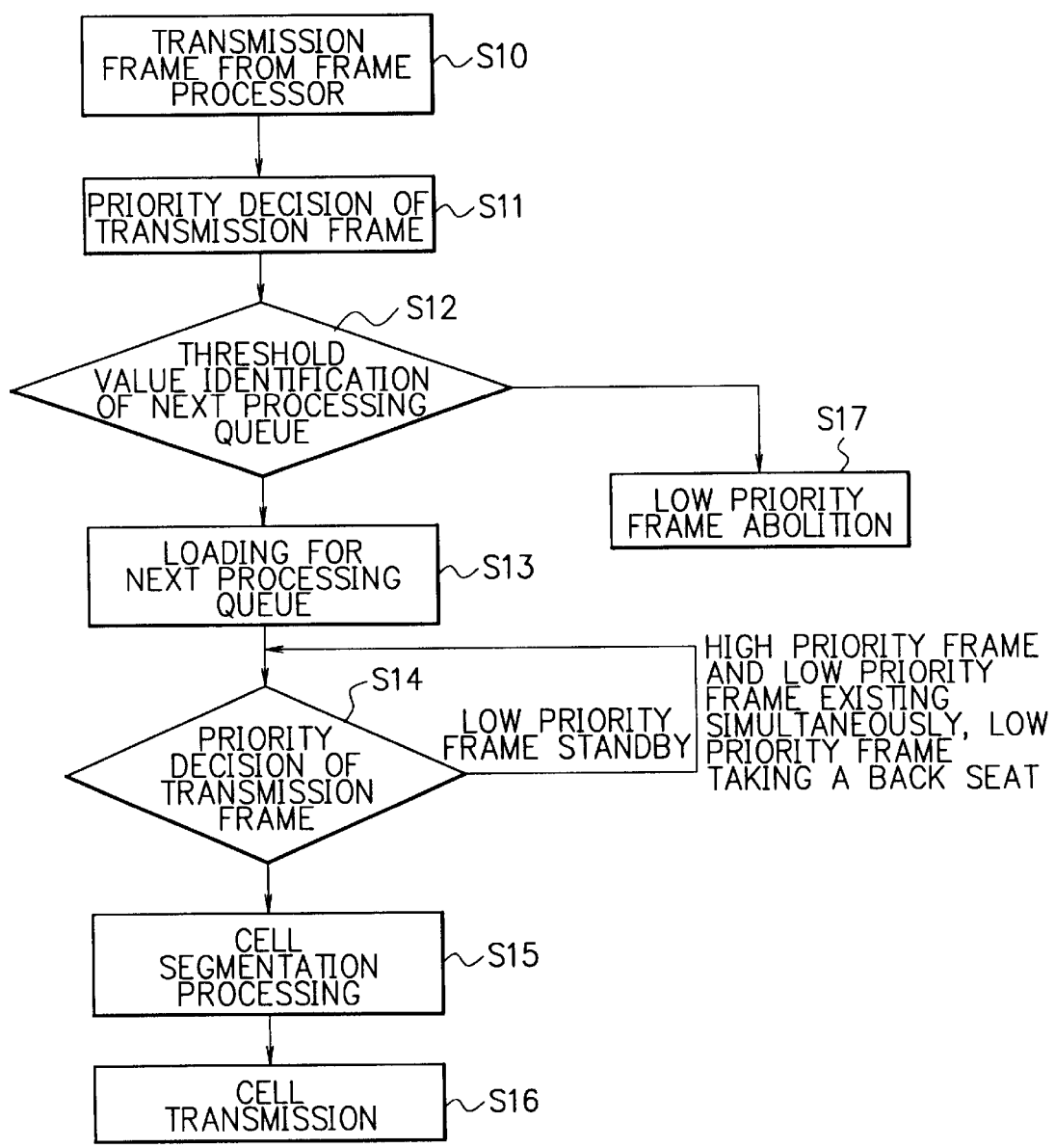

DEVICE WITH QUALITY CONTROLLABLE SAR FUNCTION BY UPPER LAYER INSTRUCTION, LSI UNIT AND QUALITY CONTROL METHOD BY UPPER LAYER INSTRUCTION

BACKGROUND OF THE INVENTION

The present invention relates to a device for ATM (Asynchronous Transfer Mode) cell transfer in ATM communication system using AAL5 (ATM Adaptation Layer Type 5), an LSI (Large Scale Integrated circuit) unit, and a method for ATM cell transfer using AAL5.

Description of the Prior Art

Formerly, in a reassembly & segmentation processing of AAL5 (ATM Adaptation Layer Type 5), generally, priority is determined according to CLP-bit (Cell-loss priority bit) of ATM (Asynchronous Transfer Mode) cell header which CLP-bit is the priority in the ATM layer. The frame which is judged as the frame whose priority is low is discarded.

When the above described method is employed in such the reassembly & segmentation processing of the conventional device, in some cases, the priority of the upper layer is not reflected to the CLP-bit. Even though the frame which is a frame whose priority is high in the upper layer exists, such the frame with high priority is discarded caused by congestion in the ATM layer.

Further, when it causes the priority in the upper layer to be attempted to be reflected to the CLP-bit, it is not always reflected the priority accurately to the CLP-bit in the ATM cell header, because the CLP-bit is 1 (one) bit, while the priority in the upper layer is 4 to 8 bits.

SUMMARY OF THE INVENTION

In view of the foregoing, it is an object of the present invention, in order to overcome the above-mentioned problems, to provide reassembly and segmentation (SAR:segmentation and reassembly sublayer) function of AAL5 while causing the priority in the upper layer to be reflected in the reassembly & segmentation processing of the AAL5 in the ATM layer processing.

According to a first aspect of the present invention, in order to achieve the above mentioned object, there is provided a device with quality controllable SAR function according to upper layer instruction, which comprises a frame storage means for executing reassembly of a frame of AAL5 (ATM Adaptation Layer Type 5) from an ATM (Asynchronous Transfer Mode) cell, an identification addition means for receiving a cell stream through a cell reassembly processor, and for adding an identifier on a basis of cell header information in order to introduce the cell which the frame storage means receives therein into the frame storage means or on the basis of upper layer information within a cell payload, a cell reassembly means for assembling the cell received by the cell reassembly processor, a next processing decision means having a second priority part for deciding either sending or abolition of the frame concerned on the basis of the received header on the occasion of sending the frame obtained from the cell received according to the cell reassembly processor and/or on the basis of the upper layer information within the payload, a storage means for storing therein an inputted transmission frame, and a selector for selecting the transmission frame sent from the storage means.

According to a second aspect of the present invention, there is provided a device with quality controllable SAR function according to upper layer instruction, which comprises a frame storage means for executing reassembly of a frame of AAL5 (ATM Adaptation Layer Type 5) from an ATM (Asynchronous Transfer Mode) cell, an identification addition means for receiving a cell stream through a cell reassembly processor, and for adding an identifier on a basis of cell header information in order to introduce the cell which the frame storage means receives therein into the frame storage means or on the basis of upper layer information within a cell payload, a cell reassembly means for assembling the cell received by the cell reassembly processor, a next processing decision means having a second priority part for deciding either sending or abolition of the frame concerned on the basis of the received header on the occasion of sending the frame obtained from the cell received according to the cell reassembly processor and/or on the basis of the upper layer information within the payload, a storage means for storing therein an inputted transmission frame, a selector for selecting the transmission frame sent from said storage means, and a cell segmentation processing means for decomposing to be processed the frame selected from the selector into cell.

A third aspect of the present invention, in the first or second aspect, there is provided a device with quality controllable SAR function, wherein the identification addition means has a first priority part which discards low priority frame in order to perform congestion avoidance accompanied by prescribed quality due to reception of high priority frame while deciding processing condition from cell header information received and/or the information from upper layer within payload when the cell reassembly means is congested.

According to a fourth aspect of the present invention, there is provided a device with quality controllable SAR function according to upper layer instruction, which comprises a frame storage means for executing reassembly of a frame of AAL5 (ATM Adaptation Layer Type 5) from an ATM (Asynchronous Transfer Mode) cell, an identification addition means for receiving a cell stream through a cell reassembly processor, and for adding an identifier on a basis of cell header information in order to introduce the cell which the frame storage means receives therein into the frame storage means or on the basis of upper layer information within a cell payload, a cell reassembly means for assembling the cell received by the cell reassembly processor, a next processing decision means having a second priority part for deciding either sending or abolition of the frame concerned on the basis of the received header on the occasion of sending the frame obtained from the cell received according to the cell reassembly processor and/or on the basis of the upper layer information within the payload, a storage means for storing therein an inputted transmission frame, and a selector for selecting the transmission frame sent from the storage means, wherein it causes a third priority part to be constituted by the storage means and the selector.

According to a fifth aspect of the present invention, in the second or forth aspect, there is provided a device with quality controllable SAR function according to upper layer instruction, wherein it causes a third priority part to be constituted by said storage means and said selector.

According to a sixth aspect of the present invention, there is provided a device with quality controllable SAR function according to upper layer instruction, which comprises a frame storage means for executing reassembly of a frame of AAL5 (ATM Adaptation Layer Type 5) from an ATM (Asynchronous Transfer Mode) cell, an identification addition means for receiving a cell stream through a cell reassembly processor, and for adding an identifier on a basis of cell header information in order to introduce the cell which the frame storage means receives therein into the frame storage means or on the basis of upper layer information within a cell payload, a cell reassembly means for assembling the cell received by said cell reassembly processor, a next processing decision means having a second priority part for deciding either sending or abolition of the frame concerned on the basis of the received header on the occasion of sending the frame obtained from the cell received according to the cell reassembly processor and/or on the basis of the upper layer information within the payload, a storage means for storing therein an inputted transmission frame, a selector for selecting the transmission frame sent from the storage means, a frame processing part interface, and a host processor interface for performing communication to the host processor.

According to a seventh aspect of the present invention, there is provided a device with quality controllable SAR function according to upper layer instruction, which comprises a frame storage means for executing reassembly of a frame of AAL5 (ATM Adaptation Layer Type 5) from an ATM (Asynchronous Transfer Mode) cell, an identification addition means for receiving a cell stream through a cell reassembly processor, and for adding an identifier on a basis of cell header information in order to introduce the cell which the frame storage means receives therein into the frame storage means or on the basis of upper layer information within a cell payload, a cell reassembly means for assembling the cell received by the cell reassembly processor, a next processing decision means having a second priority part for deciding either sending or abolition of the frame concerned on the basis of said received header on the occasion of sending the frame obtained from the cell received according to the cell reassembly processor and/or on the basis of the upper layer information within the payload, a storage means for storing therein an inputted transmission frame, a selector for selecting the transmission frame sent from the storage means, a cell segmentation processing means for segmenting to be processed the frame selected from the selector into cell, a frame processing part interface, and a host processor interface for performing communication to the host processor.

According to an eighth aspect of the present invention, in the third or fourth aspect, there is provided a device with quality controllable SAR function, which further comprises a frame processing part interface, and a host processor interface for performing communication to the host processor.

According to a ninth aspect of the present invention, in any of the first to eighth aspect, there is provided a device with quality controllable SAR function, wherein the first priority part and/or the second priority part and/or the third priority part decides priority while providing the order of priority more than 2.

According to a tenth aspect of the present invention, there is provided a device with quality controllable SAR function according to upper layer instruction, which comprises a frame storage means for executing reassembly of a frame of AAL5 (ATM Adaptation Layer Type 5) from an ATM (Asynchronous Transfer Mode) cell, an identification addition means for receiving a cell stream through a cell reassembly processor, and for adding an identifier on a basis of cell header information in order to introduce the cell which the frame storage means receives therein into the frame storage means or on the basis of upper layer information within a cell payload, a cell reassembly means for assembling the cell received by the cell reassembly processor, a next processing decision means having a second priority part for deciding either sending or abolition of the frame concerned on the basis of the received header on the occasion of sending the frame obtained from the cell received according to the cell reassembly processor and/or on the basis of the upper layer information within the payload, a storage means for storing therein an inputted transmission frame, and a selector for selecting the transmission frame sent from the storage means, wherein the device with quality controllable SAR function is LSI device.

According to an eleventh aspect of the present invention, there is provided a device with quality controllable SAR function according to upper layer instruction, which comprises a frame storage means for executing reassembly of a frame of AAL5 (ATM Adaptation Layer Type 5) from an ATM (Asynchronous Transfer Mode) cell, an identification addition means for receiving a cell stream through a cell reassembly processor, and for adding an identifier on a basis of cell header information in order to introduce the cell which the frame storage means receives therein into the frame storage means or on the basis of upper layer information within a cell payload, a cell reassembly means for assembling the cell received by the cell reassembly processor, a next processing decision means having a second priority part for deciding either sending or abolition of the frame concerned on the basis of the received header on the occasion of sending the frame obtained from the cell received according to the cell reassembly processor and/or on the basis of the upper layer information within the payload, a storage means for storing therein an inputted transmission frame, a selector for selecting the transmission frame sent from said storage means, and a cell segmentation processing means for decomposing to be processed the frame selected from the selector into cell, wherein the device with quality controllable SAR function is LSI device.

According to a twelfth aspect of the present invention, in any of the third to fifth aspect, there is provided a device with quality controllable SAR function, wherein the device with quality controllable SAR function is LSI device.

According to a thirteenth aspect of the present invention, there is provided a device with quality controllable SAR function according to upper layer instruction, which comprises a frame storage means for executing reassembly of a frame of AAL5 (ATM Adaptation Layer Type 5) from an ATM (Asynchronous Transfer Mode) cell, an identification addition means for receiving a cell stream through a cell reassembly processor, and for adding an identifier on a basis of cell header information in order to introduce the cell which the frame storage means receives therein into the frame storage means or on the basis of upper layer information within a cell payload, a cell reassembly means for assembling the cell received by said cell reassembly processor, a next processing decision means having a second priority part for deciding either sending or abolition of the frame concerned on the basis of the received header on the occasion of sending the frame obtained from the cell received according to the cell reassembly processor and/or on the basis of the upper layer information within the payload, a storage means for storing therein an inputted transmission frame, a selector for selecting the transmission frame sent from the storage means, a frame processing part interface, and a host processor interface for performing communication to the host processor, wherein the device with quality controllable SAR function is LSI device.

According to a fourteenth aspect of the present invention, there is provided a device with quality controllable SAR function according to upper layer instruction, which comprises a frame storage means for executing reassembly of a frame of AAL5 (ATM Adaptation Layer Type 5) from an ATM (Asynchronous Transfer Mode) cell, an identification addition means for receiving a cell stream through a cell reassembly processor, and for adding an identifier on a basis of cell header information in order to introduce the cell which the frame storage means receives therein into the frame storage means or on the basis of upper layer information within a cell payload, a cell reassembly means for assembling the cell received by the cell reassembly processor, a next processing decision means having a second priority part for deciding either sending or abolition of the frame concerned on the basis of the received header on the occasion of sending the frame obtained from the cell received according to the cell reassembly processor and/or on the basis of the upper layer information within the payload, a storage means for storing therein an inputted transmission frame, a selector for selecting the transmission frame sent from the storage means, a cell segmentation processing means for decomposing to be processed the frame selected from the selector into cell, a frame processing part interface, and a host processor interface for performing communication to the host processor, wherein the device with quality controllable SAR function is LSI device.

According to a fifteenth aspect of the present invention, in the eighth or ninth aspect there is provided a device with quality controllable SAR function, wherein the device with quality controllable SAR function is LSI device.

According to a sixteenth aspect of the present invention, there is provided a quality control method for dissolving congestion while implementing reassembly of frame of AAL5 from ATM cell employing a device with quality controllable SAR function and employing an LSI device comprising the process of a first priority process for discarding low priority frame from among the frames on the basis of header information of the received cell and/or information within frame of payload, before determining reception of high priority frame, a second priority process for discarding frame of low priority from among the frames whose reassembly are completed in order to insure quality on the basis of cell header information of the frame whose reassembly is completed and/or on the basis of information within header of upper layer frame while supposing congestion of a frame storage means according to information quantity capable of being stored in said frame storage means, before determining reception of high priority frame, and a third priority process for deciding either loading or abolition of the frame for either transmission demand QUEUE or QUEUE transferring to a host processor according to informed processing result of the frame accompanied with the frame from the frame processing part.

According to a seventeenth aspect of the present invention, in the sixteenth aspect, there is provided a quality control method according to upper layer instruction, in said third priority process, said processing result of the frame is at least one information selected from among header information within device accompanying the cell, cell header information, and header information of the upper layer.

The above and further objects and novel features of the invention will be more fully understood from the following detailed description when the same is read in connection with the accompanying drawings. It should be expressly understood, however, that the drawings are for purpose of illustration only and are not intended as a definition of the limits of the invention.

BRIEF DESCRIPTION OF THE DRAWINGS

FIG. 1 is a view showing a constitution of the LSI device which is a device according to the present invention;

FIG. 2 is a flowchart showing operation of the LSI device which is the device of the present invention; and FIG. 3 is a flowchart showing operation of the LSI device which is the device of the present invention.

DETAILED DESCRIPTION OF THE PREFERRED EMBODIMENTS

A preferred embodiment of the present invention will be described in detail in accordance with the accompanying drawings.

FIRST EMBODIMENT

There will be described a first embodiment of a device and LSI device (hereinafter referred to as merely LSI device) according to the present invention.

The present invention relates to the LSI device with segmentation function of the cell and reassembly function of the cell in ATM Adaptation Layer Type 5 (AAL5). It causes priority control function to be provided at the part of both of the segmentation processing of the cell and the reassembly processing of the cell on the basis of the information of IP data gram which is a label within the device and upper layer. According to this priority control function, the LSI device of the present invention executes processing of both of segmentation of the cell and the reassembly of the cell while executing identification of priority/non-priority.

There will be described fundamental constitution of the LSI device according to the present invention referring to FIG. 1.

As shown in FIG. 1, the LSI device 1 of the present invention comprises a cell segmentation processor 2, a cell reassembly processor 3, a frame buffer 4, a descriptor hunt part 10, a reassembly completion frame 11, a transmission frame selector 12, transmission frame information storage parts 13A, 13B, 13C, . . . , (plural transmission frame information storage parts, for instance 17 parts), and a reassembly completion frame next processing decision part 14.

Further, the LSI device 1 includes a frame processor interface 15, a host processor interface 16, a frame processor processing completion decision part 17, and so forth.

In the LSI device having the above described such constitution, with respect to segmentation of the cell, the present LSI 1 receives the frame descriptor corresponding to the frame through the transmission frame selector 12. Simultaneously, the LSI 1 executes decision (priority control function (3)) of the priority/non-priority according to the priority instructed from the upper layer. Further, processing load of the LSI becomes more than prescribed constant level, thus, when it is decided that the segmentation performance of the cell is influenced thereby, low priority frame is discarded, before executing processing of the high priority frame without delay. The LSI device according to the present invention has such the priority control function (3) which is an abolition priority processing function.

Further, the present LSI 1 receives a cell stream through a cell reassembly processor 3, before executing processing that it causes the frame to be finished setting up to frame buffer 4. The LSI device 1 receives header information of the cell, and information within the cell that is the upper layer included in payload of the first cell. The LSI 1 decides the priority of the frame to be processed (priority control function (1)) from above information concerning the cell according to the descriptor hunt part 10. Further, load of reception processing becomes more than prescribed constant level, thus, when it is decided that the processing performance of reassembly of the cell is influenced thereby, low priority frame is discarded, before executing processing of receiving preferentially processing of high priority frame.

The device according to the present invention has such the priority control function (1) which is an abolition priority processing function.

Consequently, the device implements decision of the priority/non-priority in such a way that it causes segmentation/reassembly (SAR) of the cell with the priority control function performed to be executed, while following not only BOM-cell and/or EOM-cell such as information of the cell header and so forth but also information of the upper layer included in the payload of the cell. Further, according to the demand, the device discards the low priority frame. Furthermore, the device receives preferentially the high priority frame. Moreover, in the transmission processing, the device has the function of delay priority processing that when there exists the high priority frame and the low priority frame simultaneously, the device preferentially transmits the high priority frame, subsequently, the device transmits the low priority frame.

There will be described in detail the first embodiment of the LSI device according to the present invention described above. The present embodiment, in the LSI device 1 with the function of the segmentation of the cell and the reassembly of the cell in the ATM Adaptation Layer Type 5 (AAL5), segmentation of the cell and reassembly of the cell are achieved by the cell segmentation processor 2, the cell reassembly processor 3, the frame buffer 4, the descriptor hunt part 10, the reassembly completion frame next processing decision part 11, the transmission frame selector 12, and the transmission frame information storage parts 13A, 13B, and 13C. The LSI device 1 implements the processing both of segmentation of the cell and reassembly of the cell while executing the priority control function such as the priority control function (1), the priority control function (2), the priority control function (3), and so forth which perform identification of the priority/non-priority according to information existing in both of the label within the device and the IP (internet protocol) data gram of the upper layer.

FIG. 1 shows outline of processing for both of segmentation of the cell and reassembly of the cell while executing the priority control functions (1) to (3) according to the present invention.

In the cell segmentation processor 2, the present LSI device 1 receives the frame and the corresponding frame descriptor through the transmission frame information storage part. Simultaneously, the LSI device 1 executes decision (priority control function (3)) of the priority/non-priority from the priority specified from the upper layer. Further, processing load of the LSI device 1 becomes more than prescribed constant level, thus, when segmentation performance of the cell is influenced, the LSI device 1 discards the low priority frame, before executing processing of the high priority frame without delay. The LSI device 1 has the priority control function (3) which is abolition priority processing function. Thus, in the present invention, even though when the frame of high priority is congested in the upper layer, it is not feared that the frame of the high priority is discarded in the upper layer, as occurs in the conventional state.

Further, in the cell reassembly processor 3, as shown in FIG. 1, the cell reassembly processor 3 of the present LSI device 1 receives the cell stream, before causing the frame to be finished setting up to the frame buffer 4 and so forth.

The present LSI device 1 implements decision of the priority/non-priority with respect to the priority (priority control function (1)) of the frame to be processed by the descriptor hunt part according to the BOM-cell which is the header information of the cell of the received cell stream here and the information within the frame of the upper layer included in the payload of the first cell. Further, the load of the reception processing exceeds the constant level, thus, when the reassembly performance of the cell is influenced, the LSI device 1 discards the low priority frame, before executing reception processing preferentially with respect to the processing of the high priority of the frame.

Thus, the present LSI device 1 of the present invention has the priority control function (1) which is the abolition priority processing function as shown in FIG. 1.

Consequently, the device implements decision of the priority/non-priority in such a way that it causes segmentation/reassembly (SAR) of the cell with the priority control performed to be executed, while following not only BOM-cell and/or EOM-cell such as information of the cell header and so forth but also information of the upper layer included in the payload of the cell. Further, according to the demand, the device discards the low priority frame. Furthermore, the device preferentially receives the high priority frame. Moreover, in the transmission processing, the device has the function of delay priority that when there exists the high priority frame and the low priority frame simultaneously, the device preferentially transmits the high priority frame, subsequently, the device transmits the low priority frame. The LSI device 1 of the present invention has the function of the delay priority.

As shown in FIG. 1 of the block diagram according to one embodiment of the present invention, the present LSI device receives ATM CELL STREAM before reassembling the frame of AAL5, subsequently, delivering the reassembled frame to the reassembly completion frame next processing decision part 11.

On this occasion, the LSI device 1 obtains area of frame buffer for reassembling the frame of AAL5. The LSI device 1 prepares an identifier for representing the area of the frame buffer at the descriptor hunt part as a descriptor. Consequently, when the LSI device 1 receives the cell for the sake of new frame, the LSI device 1 obtains new descriptor at the descriptor hunt part 10.

In the present LSI device 1, the descriptor hunt part decides the priority of the frame to be constructed, namely the priority control function (1), on the occasion of obtaining the descriptor.

The area of the frame buffer storing therein the information from the cell reassembly/cell segmentation processing part runs short, thus when remaining area of the frame buffer is less than set value beforehand, the LSI device 1 discards the low priority frame without assembling the frame (priority control function (2)).

The decision of the reassembly completion frame next processing decision part 11 with respect to the priority, namely the priority control function (2), is executed on the basis of the information accompanied by the first cell (BOM-cell) which is received. Here, the information for the sake of the priority decision is the header information within the device, which is added to the cell, and the cell header information and/or the information of field within the upper layer header in the cell payload (for instance, in the case of IPv4, to be TOS, in the case of IPv6, to be CLASS, and so forth). The priority decision is performed while referring to such information.

In the cell reassembly processor 3, it causes the frame whose reassembly of the cell has been completed to be loaded onto QUEUE for the sake of next processing through the reassembly completion frame next processing decision part 11.

Here, the frame to be processed secondly is loaded onto respective parts while being separated into following three. Namely, when the frame to be processed secondly is loaded onto the frame processing part, the frame is loaded onto a processing demand QUEUE of the frame processing part. When the frame to be processed secondly is a frame for shuttle transfer, the frame is loaded onto transmission demand QUEUE. When the frame to be processed secondly is loaded onto the host processor, the frame is loaded onto reassembly completion QUEUE.

A threshold value is set to respective QUEUEs. In the cases where the respective QUEUEs are loaded with the frame while exceeding the threshold value set beforehand. On this occasion, the LSI device 1 decides the priority of the frame, before discarding the low priority frame without loading onto the QUEUE, thus the QUEUE is loaded with only the high priority frame. This priority is the above described priority control function (2).

The priority is decided in such a way that the reassembly completion frame next processing decision part 11 implements decision of the priority/non-priority while referring to respective information of the header information within the device accompanied with the last reception cell (EOM-cell), the whole cell header information, and the header information of the upper layer in the cell payload (for instance, in the case of IPv4, to be TOS, in the case of IPv6, to be CLASS, and so forth).

Further, the frame processing part completion QUEUE within the host processor interface 16 and the transmission demand QUEUE are loaded with the frame sent from the transmission frame information storage parts 13A, 13B, 13C, . . . . Before, a threshold value is set to respective QUEUEs. In the cases where the respective QUEUEs are loaded with the frame while exceeding the threshold value set beforehand. On this occasion, the LSI device 1 decides the priority of the frame, before discarding the low priority frame without loading with the QUEUE, thus the QUEUE is loaded with only the high priority frame through the transmission frame information storage part.

This decision of the priority is implemented by the cell segmentation processor while referring to frame processing result informed from the frame processor accompanying the frame.

Thus, on the occasion of the transmission, the cell segmentation processing part 2 sends out the frame with high priority while executing cell segmentation preferentially. This priority is the above described priority control function (3).

Next, there will be described operation of such the LSI device 1 referring to FIGS. 1 to 3.

Firstly, description is made referring to flowchart of FIG. 2.

When a cell reception occurs according to a cell stream from the external part (STEP S1). It causes the priority of the reception frame to be decided from the reception cell (BOM-cell) (STEP S2).

Next, it causes condition of the threshold value of the reassembly buffer QUEUE to be judged (STEP S3). When the condition of the threshold value is less than the prescribed threshold value, reception is executed by the cell reassembly processor regardless of whether high priority or low priority, while when the threshold value exceeds the set value, it causes the frame with low priority to be discarded without receiving the frame (STEP S7). The priority processing is the priority control function (1) performed by the descriptor hunt part as shown in FIG. 1.

When the threshold value is less than the set value, the LSI device 1 receives the frame from the cell stream. The cell reassembly processor ends the reassembly of the frame received, before the cell reassembly processor delivers the frame to the next processing through the reassembly completion frame processing decision part. On this occasion, the reassembly completion frame next processing decision part confirms the priority of the reception frame. This priority processing is the priority control function (2).

Further, described above, it causes the reception frame reassembled to be delivered as the following next three processing. Namely, the reassembly completion processing demand QUEUE which is the host processor delivery processing is loaded with the reception frame reassembled. The shuttle transfer processing demand QUEUE (automatic transfer) is loaded with the reception frame reassembled. The processing demand of the frame processing part QUEUE within the frame processing part interface which is frame processing part delivery processing is loaded with the reception frame reassembled. Thus three kinds of QUEUEs are loaded with the reception frame reassembled. On this occasion, the threshold value of respective QUEUEs are judged (STEP S5), when the condition of the threshold value is less than the threshold value, it causes the loading to be executed regardless of whether high priority or low priority (STEP S6), while when the condition of the threshold value exceeds the threshold value, it causes the QUEUE for the sake of the next processing is not loaded with the frame of the low priority to be discarded (STEP S8). The priority processing is the priority control function (2).

On the other hand, as shown in flow chart of FIG. 3, when the transmission frame is delivered from the frame processing part (frame processing part processing completion next processing decision part) 14 to the present LSI, it causes identification decision of the priority of the transmission frame to be executed by the transmission frame selector (STEP S10). As the next processing of the transmission frame, there are two kinds of processing of the host processor delivery processing and the transmission processing. Namely, two kinds of processing QUEUEs (transmission demand QUEUE) are loaded with the transmission frame (STEP S13).

Previously, it causes the threshold value of respective QUEUEs to be judged (STEP S12), when the condition of the threshold value is less than the threshold value, it causes the loading to be executed regardless of whether high priority or low priority (STEP S13), while when the condition of threshold value exceeds the threshold value, it causes the frame with low priority to be discarded without loading onto the QUEUE for the sake of next processing (STEP S17). The priority processing is the priority control function (3), which is controlled according to the transmission frame information storage parts 13A, 13B, 13C and the transmission frame selector 12.

Further, with respect to the transmission frame loaded onto the next processing QUEUE, the priority of the frame read out from the QUEUE of the transmission processing is judged (STEP S14), when both of the low priority frame and the high priority frame exist, it causes the cell segmentation processing which is the transmission processing to be executed in order of the frame with high priority (STEP S15).

Further, the cell segmentation processing part sends out the cell segmented for the sake of transmission to the cell stream (STEP S16). Thus operation of the device according to the invention ends.

SECOND EMBODIMENT

Next, there will be described second embodiment of the device according to the present invention.

A fundamental constitution of the LSI device employed in the second embodiment of the present invention is identical with the constitution as shown in FIG. 1. Furthermore, in the present embodiment it causes the priority to be identified while referring to another field of the upper layer.

Thus, as the example of another field referred to, in the first embodiment, the decision and so forth is implemented while referring to TOS in the IPv4, or Class in the IPv6. In the present second embodiment, it causes decision of the priority and so forth to be executed while referring to a field with the exception of the field described above. As the example of another field to be referred to, in the IPv4, there are header length such as IHL, VER (version), TL (packet length), ID (identifier), FL (flag), OF (fragment offset), TTL (time to live), PROT (protocol), HC (header check sum), SA (transmission IP address), DA (destination IP address), option, PAD, and so forth. In the IPv6, with the exception of VER which is the same as that of the above described matters, there are Traffic Class, Flow label, Payload, Next Header, Hop Limit, Source Address, and so forth. Further, in the present second embodiment, decision of the priority and so forth are not restricted by the above described matters. Namely, unless it cause the gist of the present invention to be changed, it is capable of employing the another field for the sake of discrimination of the priority. For that reason, it becomes possible to execute the priority processing in the ATM layer with respect to the frame of the protocol with the exception of the IPv4, and the IPv6 employed generally.

Thus, in the present embodiment, it is capable of executing the priority processing in the ATM layer with respect to the frame of the protocol with the exception of the protocol (IPv4, IPv6) currently employed generally in such a way that it causes the another field to be employed for the sake of the priority identification.

Thus, in the second embodiment, it causes the priority processing according to the above described method. Further, with respect to the priority processing, not only high/low but also a large number of priority level, for instance, ultra high/high 'N'/ . . . /high '1'/medium/low 'N'/. . . /low '1'/ultra low, and so forth of levels are provided appropriately. Thus, constitution (a large number of QUEUE and/or threshold value level) for executing processing can be provided.

For that reason, it becomes possible to execute processing corresponding to a plurality of priorities indicated by the upper layer.

As described above, according to the present invention, the LSI device is provided with function for implementing reassembly/segmentation processing of AAL5 on the basis of the priority accompanied by the another function part within the device in the end terminal part of the ATM layer. Accordingly, it becomes possible to cope with the higher priority control function than the priority control function according to merely CLP-bit in the ATM layer. There is not the danger that the high priority frame in the upper layer is discarded caused by congestion at the ATM layer.

Further, it becomes possible to correspond to the priority in the protocol such as IPv4, IPv6, GMN-CL core frame, and so forth, which are the upper layer included in the payload of the ATM cell. Thus, it becomes possible to correspond to delay and/or frame abolition caused by congestion in the ATM layer. Consequently, the processing becomes possible in the lower layer (ATM layer) while taking the priority of the upper layer into consideration.

While preferred embodiment of the invention have been described using specific terms, the description has been for illustrative purpose only, and it is to be understood that changes and variations may be made without departing from the spirit or scope of the following claims.

What is claimed is:

1. A device with quality controllable SAR function according to upper layer instruction comprising:

a frame storage means for executing reassembly of a frame of AAL5 (ATM Adaptation Layer Type 5) from an ATM (Asynchronous Transfer Mode) cell;

an identification addition means for receiving a cell stream through a cell reassembly processor, and for adding an identifier on a basis of cell header information in order to introduce the cell which said frame storage means receives therein into said frame storage means or on the basis of upper layer information within a cell payload;

a cell reassembly means for assembling the cell received by said cell reassembly processor;

a next processing decision means having a second priority part for deciding either sending or abolition of the frame concerned on the basis of said received header on the occasion of sending the frame obtained from the cell received according to said cell reassembly processor and/or on the basis of said upper layer information within the payload;

a storage means for storing therein an inputted transmission frame; and a selector for selecting the transmission frame sent from said storage means.

2. A device with quality controllable SAR function as claimed in claim 1, wherein said identification addition means has a first priority part which discards low priority frame in order to perform congestion avoidance accompanied by prescribed quality due to reception of high priority frame while deciding processing condition from cell header information received and/or said information from upper layer within payload when said cell reassembly means is congested.

3. A device with quality controllable SAR function as claimed in claim 2, wherein it causes a third priority part to be constituted by said storage means and said selector.

4. A device with quality controllable SAR function as claimed in claim 3, wherein said first priority part and/or said second priority part and/or said third priority part decides priority while providing the order of priority more than 2.

5. A device with quality controllable SAR function as claimed in claim 4, wherein said device with quality controllable SAR function is LSI device.

6. A device with quality controllable SAR function as claimed in claim 3, wherein said device with quality controllable SAR function is LSI device.

7. A device with quality controllable SAR function as claimed in claim 2, further comprising:
   a frame processing part interface; and
   a host processor interface for performing communication to the host processor.

8. A device with quality controllable SAR function as claimed in claim 7, wherein said device with quality controllable SAR function is LSI device.

9. A device with quality controllable SAR function as claimed in claim 2, wherein said device with quality controllable SAR function is LSI device.

10. A device with quality controllable SAR function according to upper layer instruction comprising:
   a frame storage means for executing reassembly of a frame of AAL5 (ATM Adaptation Layer Type 5) from an ATM (Asynchronous Transfer Mode) cell;
   an identification addition means for receiving a cell stream through a cell reassembly processor, and for adding an identifier on a basis of cell header information in order to introduce the cell which said frame storage means receives therein into said frame storage means or on the basis of upper layer information within a cell payload;
   a cell reassembly means for assembling the cell received by said cell reassembly processor;
   a next processing decision means having a second priority part for deciding either sending or abolition of the frame concerned on the basis of said received header on the occasion of sending the frame obtained from the cell received according to said cell reassembly processor and/or on the basis of said upper layer information within the payload;
   a storage means for storing therein an inputted transmission frame;
   a selector for selecting the transmission frame sent from said storage means; and
   a cell segmentation processing means for decomposing to be processed the frame selected from said selector into cell.

11. A device, with quality controllable SAR function as claimed in claim 10, wherein said identification addition means has a first priority part which discards low priority frame in order to perform congestion avoidance accompanied by prescribed quality due to reception of high priority frame while deciding processing condition from cell header information received and/or said information from upper layer within payload when said cell reassembly means is congested.

12. A device with quality controllable SAR function as claimed in claim 11, wherein it causes a third priority part to be constituted by said storage means and said selector.

13. A device with quality controllable SAR function as claimed in claim 12, wherein said first priority part and/or said second priority part and/or said third priority part decides priority while providing the order of priority more than 2.

14. A device with quality controllable SAR function as claimed in claim 13, wherein said device with quality controllable SAR function is LSI device.

15. A device with quality controllable SAR function as claimed in claim 12, wherein said device with quality controllable SAR function is LSI device.

16. A device with quality controllable SAR function as claimed in claim 11, further comprising:
   a frame processing part interface; and
   a host processor interface for performing communication to the host processor.

17. A device with quality controllable SAR function as claimed in claim 16, wherein said device with quality controllable SAR function is LSI device.

18. A device with quality controllable SAR function as claimed in claim 11, wherein said device with quality controllable SAR function is LSI device.

19. A device with quality controllable SAR function according to upper layer instruction comprising:
   a frame storage means for executing reassembly of a frame of AAL5 (ATM Adaptation Layer Type 5) from an ATM (Asynchronous Transfer Mode) cell;
   an identification addition means for receiving a cell stream through a cell reassembly processor, and for adding an identifier on a basis of cell header information in order to introduce the cell which said frame storage means receives therein into said frame storage means or on the basis of upper layer information within a cell payload;
   a cell reassembly means for assembling the cell received by said cell reassembly processor;
   a next processing decision means having a second priority part for deciding either sending or abolition of the frame concerned on the basis of said received header on the occasion of sending the frame obtained from the cell received according to said cell reassembly processor and/or on the basis of said upper layer information within the payload;
   a storage means for storing therein an inputted transmission frame; and
   a selector for selecting the transmission frame sent from said storage means,
   wherein it causes a third priority part to be constituted by said storage means and said selector.

20. A device with quality controllable SAR function as claimed in claim 19, further comprising:
   a frame processing part interface; and
   a host processor interface for performing communication to the host processor.

21. A device with quality controllable SAR function as claimed in claim 20, wherein said device with quality controllable SAR function is LSI device.

22. A device with quality controllable SAR function as claimed in claim 19, wherein said device with quality controllable SAR function is LSI device.

23. A device with quality controllable SAR function according to upper layer instruction comprising:
   a frame storage means for executing reassembly of a frame of AAL5 (ATM Adaptation Layer Type 5) from an ATM (Asynchronous Transfer Mode) cell;
   an identification addition means for receiving a cell stream through a cell reassembly processor, and for adding an identifier on a basis of cell header information in order to introduce the cell which said frame storage means receives therein into said frame storage means or on the basis of upper layer information within a cell payload;
   a cell reassembly means for assembling the cell received by said cell reassembly processor;
   a next processing decision means having a second priority part for deciding either sending or abolition of the frame concerned on the basis of said received header on the occasion of sending the frame obtained from the cell received according to said cell reassembly processor and/or on the basis of said upper layer information within the payload;

a storage means for storing therein an inputted transmission frame;

a selector for selecting the transmission frame sent from said storage means; and a cell segmentation processing means for decomposing to be processed the frame selected from said selector into cell, wherein it causes a third priority part to be constituted by said storage means and said selector.

24. A device with quality controllable SAR function as claimed in claim 23, wherein s aid device with quality controllable SAR function is LSI device.

25. A device with quality controllable SAR function according to upper layer instruction comprising:

a frame storage means for executing reassembly of a frame of AAL5 (ATM Adaptation Layer Type 5) from an ATM (Asynchronous Transfer Mode) cell;

an identification addition means for receiving a cell stream through a cell reassembly processor, and for adding an identifier on a basis of cell header information in order to introduce the cell which said frame storage means receives therein into said frame storage means or on the basis of upper layer information within a cell payload;

a cell reassembly means for assembling the cell received by said cell reassembly processor;

a next processing decision means having a second priority part for deciding either sending or abolition of the frame concerned on the basis of said received header on the occasion of sending the frame obtained from the cell received according to said cell reassembly processor and/or on the basis of said upper layer information within the payload;

a storage means for storing therein an inputted transmission frame;

a selector for selecting the transmission frame sent from said storage means;

a frame processing part interface; and a host processor interface for performing communication to the host processor.

26. A device with quality controllable SAR function according to upper layer instruction comprising:

a frame storage means for executing reassembly of a frame of AAL5 (ATM Adaptation Layer Type 5) from an ATM (Asynchronous Transfer Mode) cell;

an identification addition means for receiving a cell stream through a cell reassembly processor, and for adding an identifier on a basis of cell header information in order to introduce the cell which said frame storage means receives therein into said frame storage means or on the basis of upper layer information within a cell payload;

a cell reassembly means for assembling the cell received by said cell reassembly processor;

a next processing decision means having a second priority part for deciding either sending or abolition of the frame concerned on the basis of said received header on the occasion of sending the frame obtained from the cell received according to said cell reassembly processor and/or on the basis of said upper layer information within the payload;

a storage means for storing therein an inputted transmission frame;

a selector for selecting the transmission frame sent from said storage means;

a cell segmentation processing means for decomposing to be processed the frame selected from said selector into cell;

a frame processing part interface; and a host processor interface for performing communication to the host processor.

27. A device with quality controllable SAR function according to upper layer instruction comprising:

a frame storage means for executing reassembly of a frame of AAL5 (ATM Adaptation Layer Type 5) from an ATM (Asynchronous Transfer Mode) cell;

an identification addition means for receiving a cell stream through a cell reassembly processor, and for adding an identifier on a basis of cell header information in order to introduce the cell which said frame storage means receives therein into said frame storage means or on the basis of upper layer information within a cell payload;

a cell reassembly means for assembling the cell received by said cell reassembly processor;

a next processing decision means having a second priority part for deciding either sending or abolition of the frame concerned on the basis of said received header on the occasion of sending the frame obtained from the cell received according to said cell reassembly processor and/or on the basis of said upper layer information within the payload;

a storage; means for storing therein an inputted transmission frame; and a selector for selecting the transmission frame sent from said storage means, wherein said device with quality controllable SAR function is LSI device.

28. A device with quality controllable SAR function according to upper layer instruction comprising:

a frame storage means for executing reassembly of a frame of AAL5 (ATM Adaptation Layer Type 5) from an ATM (Asynchronous Transfer Mode) cell;

an identification addition means for receiving a cell stream through a cell reassembly processor, and for adding an identifier on a basis of cell header information in order to introduce the cell which said frame storage means receives therein into said frame storage means or on the basis of upper layer information within a cell payload;

a cell reassembly means for assembling the cell received by said cell reassembly processor;

a next processing decision means having a second priority part for deciding either sending or abolition of the frame concerned on the basis of said received header on the occasion of sending the frame obtained from the cell received according to said cell reassembly processor and/or on the basis of said upper layer information within the payload;

a storage means for storing therein an inputted transmission frame;

a selector for selecting the transmission frame sent from said storage means; and a cell segmentation processing means for decomposing to be processed the frame selected from said selector into cell, wherein said device with quality controllable SAR function is LSI device.

29. A device with quality controllable SAR function according to upper layer instruction comprising:

a frame storage means for executing reassembly of a frame of AAL5 (ATM Adaptation Layer Type 5) from an ATM (Asynchronous Transfer Mode) cell;

an identification addition means for receiving a cell stream through a cell reassembly processor, and for adding an identifier on a basis of cell header information in order to introduce the cell which said frame storage means receives therein into said frame storage means or on the basis of upper layer information within a cell payload;

a cell reassembly means for assembling the cell received by said cell reassembly processor;

a next processing decision means having a second priority part for deciding either sending or abolition of the frame concerned on the basis of said received header on the occasion of sending the frame obtained from the cell received according to said cell reassembly processor and/or on the basis of said upper layer information within the payload;

a storage means for storing therein an inputted transmission frame;

a selector for selecting the transmission frame sent from said storage means;

a frame processing part interface; and a host processor interface for performing communication to the host processor, wherein said device with quality controllable SAR function is LSI device.

30. A device with quality controllable SAR function according to upper layer instruction comprising:

a frame storage means for executing reassembly of a frame of AAL5 (ATM Adaptation Layer Type 5) from an ATM (Asynchronous Transfer Mode) cell;

an identification addition means for receiving a cell stream through a cell reassembly processor, and for adding an identifier on a basis of cell header information in order to introduce the cell which said frame storage means receives therein into said frame storage means or on the basis of upper layer information within a cell payload;

a cell reassembly means for assembling the cell received by said cell reassembly processor;

a next processing decision means having a second priority part for deciding either sending or abolition of the frame concerned on the basis of said received header on the occasion of sending the frame obtained from the cell received according to said cell reassembly processor and/or on the basis of said upper layer information within the payload;

a storage means for storing therein an inputted transmission frame;

a selector for selecting the transmission frame sent from said storage means;

a cell segmentation processing means for decomposing to be processed the frame selected from said selector into cell;

a frame processing part interface; and a host processor interface for performing communication to the host processor, wherein said device with quality controllable SAR function is LSI device.

31. A quality control method for dissolving congestion while implementing reassembly of frame of AAL5 from ATM cell employing a device with quality controllable SAR function and employing an LSI device comprising the process of:

a first priority process for discarding low priority frame from among the frames on the basis of header information of the received cell and/or information within frame of payload, before determining reception of high priority frame;

a second priority process for discarding frame of low priority from among the frames whose reassembly are completed in order to insure quality on the basis of cell header information of the frame whose reassembly is completed and/or on the basis of information within header of upper layer frame while supposing congestion of a frame storage means according to information quantity capable of being stored in said frame storage means, before determining reception of high priority frame; and a third priority process for deciding either loading or abolition of the frame for either transmission demand QUEUE or QUEUE transferring to a host processor according to informed processing result of the frame accompanied with the frame from said frame processing part.

32. A quality control method according to upper layer instruction as claimed in claim 31, in said third priority process, said processing result of the frame is at least one information selected from among header information within device accompanying the cell, cell header information, and header information of the upper layer.

* * * * *